United States Patent [19]
Flemming et al.

[11] Patent Number: 5,246,409
[45] Date of Patent: Sep. 21, 1993

[54] AUTOMATIC TRANSMISSION

[76] Inventors: William Flemming; William Stillwagon, both of c/o Philadelphia Electric Company, 2301 Market St., P.O. Box 8699, Philadelphia, Pa. 19101

[21] Appl. No.: 647,768

[22] Filed: Jan. 30, 1991

[51] Int. Cl.[5] ............................................. F16H 59/00
[52] U.S. Cl. ...................................... 475/276; 74/867
[58] Field of Search ............... 475/276, 277, 278, 280; 74/867

[56] References Cited

U.S. PATENT DOCUMENTS

| | | | |
|---|---|---|---|
| 4,263,822 | 4/1981 | Harmon | 475/280 X |
| 4,416,358 | 11/1983 | Kapp | 192/332 |
| 4,493,228 | 1/1985 | Vukovich | 74/858 |
| 4,513,640 | 4/1985 | Stevenson | 74/870 |
| 4,653,350 | 3/1987 | Downs et al. | 74/864 |
| 4,653,351 | 3/1987 | Downs et al. | 74/866 |
| 4,672,862 | 6/1987 | Chana | 74/843 |
| 4,680,959 | 7/1987 | Henry et al. | 73/117 |
| 4,719,812 | 1/1988 | Machida et al. | 74/335 |

OTHER PUBLICATIONS

Detroit Diesel Allison, Service Information Letter, 10-TR-80, Feb. 20, 1988.
Allison Transmission, Service Information Letter, 5–TR-90, Feb., 1990.

*Primary Examiner*—Rodney H. Bonck
*Assistant Examiner*—Ryan W. Massey
*Attorney, Agent, or Firm*—Paul & Paul

[57] ABSTRACT

A reverse bypass check valve is removed from the hydraulic control system of Allison MT 653 truck transmission while simultaneously raising the rate of increase of the main hydraulic pressure which occurs upon increasing the radial speed of the oil pump. Premature failure of the transmission will be avoided without reducing transmission performance.

3 Claims, 4 Drawing Sheets

AUTOMATIC TRANSMISSION

BACKGROUND OF THE INVENTION

1. Field of the Invention

This invention relates generally to automatic transmissions for trucks, and more specifically to automatic truck transmissions fitted with bypass valves for reducing dead time or delay in transmitting fluid control pressure signals when gears are changed manually.

2. Brief Description of the Prior Art

The Detroit Diesel Allision Division of General Motors Corporation is the largest producer of automatic transmissions for truck and other heavy vehicles. An important product has been the MT 650 transmission with five forward speeds. This transmission was introduced in model year 1974. The construction, operation, and repair of this transmission are described in detail in *Service Manual, Allison Transmissions, Automatic Models MT 640, 643, MT 650, 653* (Detroit Diesel Allision, Indianapolis, 1983), incorporated herein by reference. The MT 653 transmission is a modified version of the 650 transmission.

In the early production models of the MT 650 and 653 transmissions an extended time delay of from about five to forty seconds of clutch-up or engagement for reverse gear operation occured in some transmission applications. The delay was a result of the priority design of the hydraulic control system and occured when a shift was made from low gear to reverse gear. In the MT 650 and 653 transmissions, low gear, the lowest forward gear, is a very low gear which must be engaged manually, and first gear is the lowest forward gear which is shifted automatically. There are always two clutches engaged in the drive train for each gear. In first gear these are the first clutch and the forward clutch; in reverse gear these are the first clutch and the fourth clutch. In neutral, there is only one clutch applied, the first clutch. Thus, the shift from low gear to reverse gear involve releasing the forward and low clutches and applying the first and fourth clutches.

In an attempt to remedy the delay, the transmissions were modified by installing a bypass fitted with a check valve in between the reverse pressure line (fourth clutch circuit) and the first clutch apply pressure line (first clutch circuit). The check valve included a plastic ball valve member and was positioned to seal when the pressure in the first clutch apply pressure line was greater than the pressure in the reverse pressure line, and to open when the pressure in the reverse pressure line was greater than the pressure in the first clutch apply pressure line.

The plastic ball of the check valve would tend to dissolve i the transmission fluid. After a period of about three to five years, in particular in transmissions equipped with power-take off ("PTO") fittings for supplying hydraulic pressure to hydraulic cylinders used for sundry purposes in certain types of heavy vehicles, the ball would fail to seal when the transmission fluid pressure was raised in the first clutch pressure line.

In these transmissions, a forward clutch and the low clutch are simultaneously applied in operation of the first forward gear, and the first clutch and a fourth clutch are simultaneously applied in operation of reverse gear. However, if, when first gear is engaged the second clutch pressure line is then pressurized, the check valve fails to seal, the reverse pressure line is also pressured, and the forward, first and fourth clutches are all applied simultaneously, resulting in severe damage to the transmission. This requires a time-consuming and expensive rebuilding of the failed transmission. If the ball were to fail when the transmission was in neutral, the first and fourth clutches would be unintentionally applied, and the vehicle would begin to move backwards, a potentially very dangerous situation.

A number of different plastic materials for the ball, including nylon, were apparently substituted by the transmission manufacturer in attempts to solve this substantial problem, all without ultimate success.

Since the time that installation of the plastic check valve in new model transmissions was initiated by the manufacturer, the manufacturer also altered the transmissions by replacing the input oil pressure pump with a "wide gear" version so as to increase the rate at which input oil pressure increases when the engine is accelerated Previously, the drive and driven gears of the oil pump had a width specified to be from 0.6835 inch to 0.6855 inch while the "wide gear" pump which replaced the earlier model has drive and driven gears which have a width specified to be from about 0.8180 inch thick to 0.8205 inch thick Two different driven gear widths and four different drive gear widths have been provided by the manufacturer for replacement, as slightly wider gears must be fit when a transmission is rebuilt and the oil pump cavity has become worn through circulation of oil suspending abrasive particles. The width of the drive gear is specified to be within plus or minus two and one half ten thousands of an inch and the with of the driven gear is specified to be within plus or minus five ten thousands of an inch.

The transmission manufacturer provided instructions for eliminating the delay in units in field service in "S.I.L. 10-TR-80," Feb. 20, 1980, as well as in Instruction Sheet No. 230, used in connection with Service Kit Part Number 23041150, including a template and replacement separator plate for use in these transmissions. S.I.L. 10-TR-80 and Instruction Sheet No. 230 are each incorporated herein by reference.

Heavy vehicles equipped with Allison MT 650 transmissions are widely used, and the rebuilding required after about three to five years service is extremely costly for owners of fleets of such vehicles, including utility companies. The costs include not only the direct cost of rebuilding the transmissions, but also the cost of maintaining larger fleets than would otherwise be necessary, the costs to customers for whom service is delayed because of transmission failure, and the like. Despite apparently repeated efforts to remedy the problem, the manufacturer has apparently been unsuccessful. There is a significant need for an improved transmission which simultaneously overcomes the problem of delay encountered when shifting from first to reverse gear, and the premature failure encountered after only about three to five years of service of transmissions having plastic ball check valves in between the first clutch apply pressure line and the reverse pressure line.

SUMMARY OF THE INVENTION

The present invention provides an improved automatic transmission for trucks, and overcomes both the problem of extended delay encountered in changing from low to reverse gear in original equipment Allison 650 transmissions and the problem of limited service life encountered with PTO-equipped Allison 650 transmissions fitted with bypass check valves between the first clutch apply pressure line and the reverse pressure line by the manufacturer or by field service technicians pursuant to the manufacturer's directions.

The invention comprises eliminating the check valve between the first clutch apply pressure line and the reverse line and sealing the bypass between the first clutch pressure line and the reverse line, while simultaneously increasing the rate at which the main hydraulic pressure increases when the radial speed of the oil pump increases, as when the engine driving the transmission is accelerated. Preferably, the rate of increase of main hydraulic pressure is at least the rate provided by an oil pump assembly with a drive gear and driven gear having a thickness of from about 0.8180 inch to 0.8205 inch, such as those having Allison transmision parts numbers 23015397, 23015398, 23015399 or 23015400 (drive gear) and 23016106 or 2301607 (driven gear) respectively. In addition, it is preferred that the forward knock down aperture in the separator plate of the transmission have a diameter be small, such as of from 0.037 to 0.043 inches, to provide a quicker increase in the main pressure obtained when the transmission is shifted into reverse and the engine is accelerated It has been found that when the main hydraulic pressure increases at the rate provided by this oil pump gear set, the delay encountered in changing from first to reverse gear in the improved transmission is minimal, even when the bypass is sealed. This gear set became the standard set used in these transmissions some years after the check valve became a standard feature. Thus, this invention can be implemented on many existing trucks equipped with Allison MT 650 transmissions by simply eliminating the check valve. This can be accomplished by providing a new valve body separator plate having no aperture in which a check valve ball can be positioned Because there is no longer a plastic valve member, the possibility of catastrophic failure of the check valve after three to five years of service is eliminated. Consequently, it is believed that the average service life of the modified transmission will be greater than the three to five year life of an unmodified transmission fitted with the check valve.

DETAILED DESCRIPTION OF THE PREFERRED EMBODIMENTS

Figure 3:
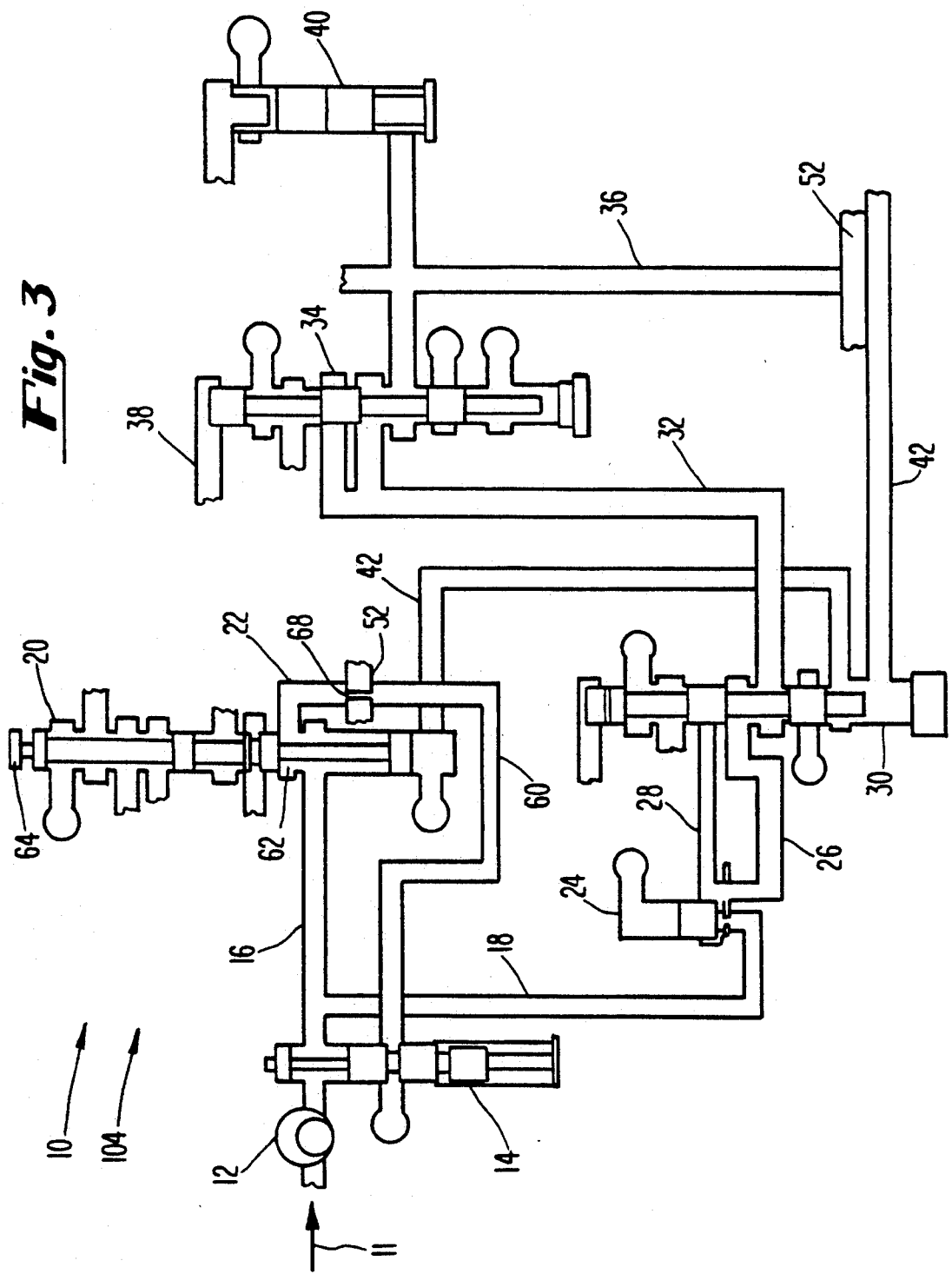
FIG. 3 is a partial schematic view of the hydraulic control system of an improved Allison MT 653 transmission of the present invention.

Referring now to the drawings in detail, wherein like reference numerals indicate like elements in each of the several views, reference is first made to FIG. 3, wherein a partial schematic view of the hydraulic system of an improved Allison MT 653 transmission 10 according to the present invention is shown. The improved hydraulic system lacks a hydraulic connection between the first clutch apply pressure line 36 and the reverse pressure line 42 which is found in prior art, unmodified MT 653 transmissions.

Figure 2:
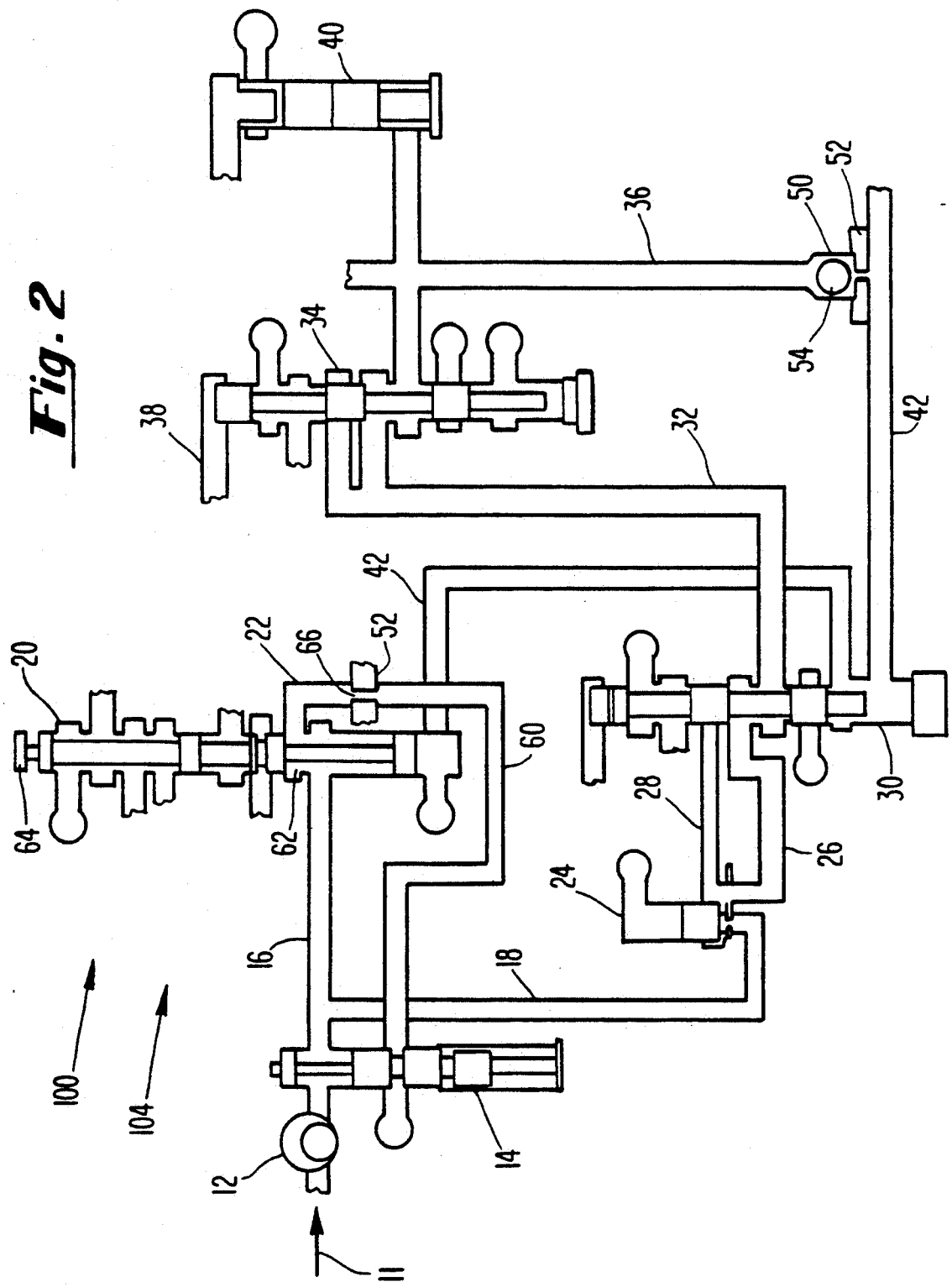
FIG. 2 is a partial schematic view of the hydraulic control system of an unmodified Allison MT 653 transmission of the prior art.

FIG. 2 is a partial schematic view of the hydraulic system of a prior art, unmodified Allison MT 653 transmission 100 having a reverse bypass priority check valve 50 including a plastic ball valve member 52. The reverse bypass priority check valve 50 connects the first clutch apply pressure line 36 and the reverse pressure line 42.

Figure 1:
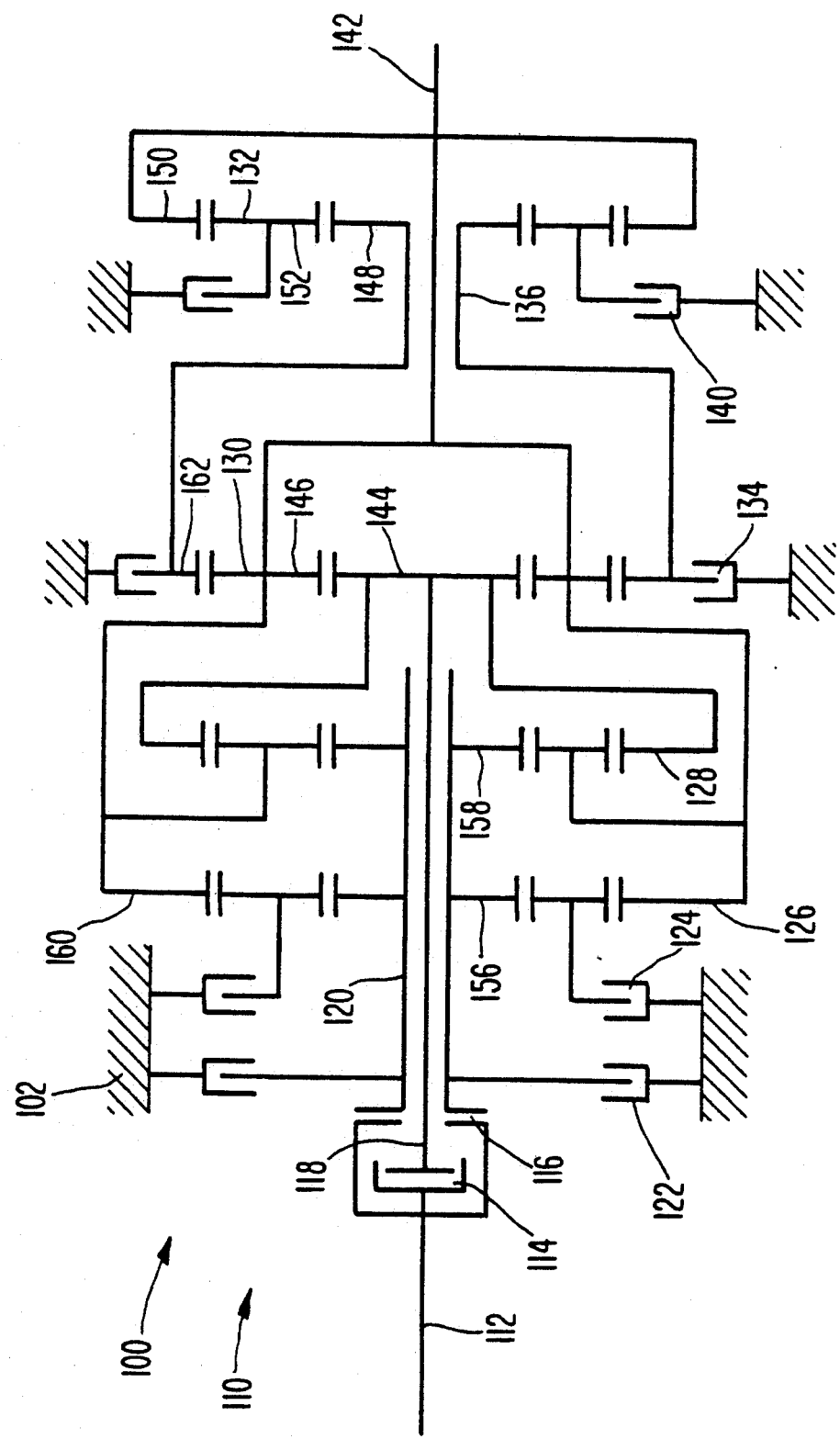
FIG. 1 is a partial schematic view of the torque transfer system of an Allison MT 653 transmission of the prior art.

FIG. 1 is a partial schematic view of the torque transfer system of the Allison MT 650 and 653 transmissions. The transmission 100 includes a clutch and gear assembly 110 which is employed to transmit torque from the truck engine (not shown) to the drive shaft (not shown) at varying gear ratios. The gear ratios include neutral, reverse, low, and four additional forward speeds. Each gear, ratio except neutral is achieved by selectively engaging two of six hydraulic clutches 114, 116, 122, 124, 134, 140. In neutral only a single clutch, the first clutch 134, is engaged. In low gear the forward clutch 114 and the low clutch 140 are engaged. In reverse gear the first clutch 134 and the fourth clutch 116 are engaged.

The various gear ratios are achieved by locking various portions of the clutch and gear assembly 110. The clutch and gear assembly 110 includes four planetary gear sets: a front planetary gear set 126, a center planetary gear set 128, a rear planetary gear set 130, and a low planetary gear set 132. In the transmission 100 torque from the truck engine (not shown) is transmitted through the a torque converter (not shown) to a turbine shaft 112. The torque converter (not shown) also supplies hydraulic fluid to the power take-off unit (not shown) in transmissions so equipped.

In all forward gears including low gear, the forward clutch 114 is applied, and the turbine shaft 112 and a main shaft assembly 118 are locked together hydraulically. The sun gear 144 of the rear planetary gear set 130 and the main shaft assembly 118 are joined and rotate together, transmitting torque to the plural planetary gears 146 of the rear planetary gear set 130. The planetary gears 146 are mechanically joined to an output shaft 142, the output shaft 142 being mechanically joined to the ring gear 150 of the low planetary gear set 132.

In low gear, the low clutch 140 is applied to lock the planetary gears 152 of the low planetary gear set 132 to the tranmission housing 102. The planetary action of the low planetary gear set 132 occurring between the locked planetary gears 152 and the driven ring gear 150 thereby providing the desired gear ratio reduction. Similarly, in first, second and third foward gears the first clutch 134, second clutch 124, or third clutch 122 is engaged to provide the desired gear ratio by planetary action of one of the other three planetary gear sets 126, 128, 130.

Two planetary gears sets and compound planetary action are used to provide reverse gear. In reverse gear a fourth clutch 116 is applied, locking the turbine shaft 112 and a sun gear shaft assembly 120 which is mechanically joined to the sun gears 156, 158 of the front and center planetary gear sets 126, 128. Torque is transmitted through the ring gear 160 of the front planetary gear set 124 to the planetary gears 146 of the rear planetary gear set 130 and the output shaft 142. In reverse gear the ring gear 162 of the rear planetary gear set 130 is locked to the transmission housing 102 by application of the first clutch 134. The compound planetary action of the first and rear planetary gear sets 126, 130 thereby provide reverse gear.

All of the six clutches in the MT 650 and 653 transmissions are operated by application of hydraulic pressure. FIG. 2 is a partial schematic representation of the hydraulic control system 104 of an Allison 653 transmission 100 of the prior art. Each of the six clutches 114, 116, 122, 124, 134, 140 (FIG. 1) has its own hydraulic circuit for controlling the application and release of the clutch. Transmission fluid at low pressure is drawn from the transmission sump (not shown) and through an engine-driven, positive displacement pump 12 in the direction shown by the arrow 11 in FIG. 2. The pump 12 comprises a drive gear and driven gear (not shown). The output from the pump 12 is fed to a main regulator valve 14, the fluid output of the main regulator valve 14 being at the main pressure of the hydraulic control system 104. The pressure of the oil provided to the regulator valve depends on the engine speed through the torque convertor of the transmission. As engine speed increases, so does the output pressure of the oil pump, as does the output pressure of the main regulator valve 14. The rate at which the output pressure of the main regulator increases when the engine speed increase depends upon the rate of oil pressure increase in the output of the oil pump 12.

A portion of the transmission fluid output from the main pressure regulator valve 14 is fed through a first line 16 to a manual selector valve 20. The manual selector valve 20 includes a complex valve body 64, and controls the flow of transmission fluid through a plurality of lines. The manual selector valve 20 is manually controlled by the driver of the vehicle to choose any of a variety of gears or gear ranges, including neutral, reverse, low, and various forward gear ranges. Except under emergency overspeed conditions, the transmission 100 will not upshift automatically from low to first forward gears, and low gear is only selectable by manually shifting from another gear. Similarly, the transmission will not automatically shift into either neutral or reverse gears; these must be chosen by the driver by shifting the manual selector valve 20.

In all forward gears transmission fluid at main pressure is fed back through a return line 22 from the manual selector valve 22 to the main regulator valve 14 and applied to the main regulator in a manner to reduce the equilibrium main pressure to at least about 125 psi at engine idle (about 600 rpm) and from about 165 to 190 psi at 1200 rpm engine speed. In reverse gear the fluid is not fed back from the manual selector valve 20 to the main regulator valve 14 and the main pressure rises.

Each clutch is connected to the main pressure through a relay valve and a trimmer valve, except for the forward clutch which is connected only through the manual selector valve. In these transmissions, there is a trimmer regulator valve (not shown) which supplies a regulated pressure to the trimmer valves. The trimmer regulator valve reduces the main pressure to a regulated pressure, which is raised or lowered by a modulator pressure which is a function of the extent to which the throttle (not shown) is open. The trimmer valves themselves reduce the pressure supplied to the clutch apply circuit during initial application, and subsequently increase pressure to an operating maximum, thereby applying the clutches gently, and avoiding shift shock.

The first clutch 134 (FIG. 1) is applied in neutral, in first gear, as well as in reverse gear. However, it is not applied in low gear. In neutral and in first gear, the first clutch 134 is fed through a lengthy sequence of valves from the main pressure regulator 14. The main pressure is fed through a second line 28 to a priority valve 24. The priority valve 24 ensures that the control system upstream from the priority valve 24 will have sufficient pressure during shifts to perform its automatic functions. The main pressure from the priority valve 24 is then fed through a third line 26 and fourth line 28 to a 2-3 relay valve 30, which functions to automatically shift from first to second gear when a preset governor pressure, generated by a transmission governor (not shown), is attained. When the 2-3 relay valve 30 is in a first predetermined position, the main pressure is fed through a 1-2 feed line 32 to the 1-2 shift valve 34. The 1-2 shift valve 34 controls application of pressure to the low clutch 140 (FIG. 1), and permits automatic shifting from low to first gear should overspeeding of the transmission 100 occur.

In a first predetermined position the 1-2 shift valve 34 supplies a regulated first clutch apply pressure through a first clutch apply line 36 to the first clutch (not shown on FIG. 2). The first clutch pressure is conditioned by the first clutch trimmer valve 40, reducing the first clutch apply pressure when the first clutch is intially applied.

In low gear the low clutch 140 and the forward clutch 114 (FIG. 1) are applied. The low clutch apply pressure is controlled by the 1-2 shift valve 34 (FIG. 2), the signal pressure being fed from the selector valve 20 through a 2-1 inhibitor valve (not shown) to the 1-2 shift valve 34 through a low clutch signal line 38.

When a shift from low gear to reverse is made, the first clutch 134 (FIG. 1) is applied. In early series Model MT 650 and 653 transmissions, not equipped with a reverse priority bypass 50, first clutch apply pressure was initially supplied only through the circuit including the priority valve 24, the 2-3 relay valve 30 and the 1-2 shift valve 34, such as shown in FIG. 3 for the present invention. The inital first clutch apply pressure was initially reduced by a first clutch trimmer valve 40. In these early model transmissions, the main pressure increased at the slower rate when the engine speed increased than the main pressure increases presently.

The oil pump presently provided as standard equipment in Allison MT 650 and 653 transmissions provides increased oil pressure at a substantially greater rate than that provided by the oil pump employed at the time when the manufacturer began providing transmissions with check valves installed. It is believed that the rate of oil pressure increase is related to the width of the drive and driven gears in the oil pump, as the present drive and driven gears are widen than those in the pump previously supplied. The parts numbers of the present drive and driven gears of the oil pump assembly are Allison transmision parts numbers 23015397, 23015398, 23015399 or 23015400 (drive gear) and 23016106 or 2301607 (driven gear) respectively. The oil pump assembly has a drive gear and driven gear each having a thickness of from about 0.8180 inch to 0.8205 inch. It is believed that that greater oil pump gear width, as compared with early models in which the gear width was about 0.685 inch, results in a greater volume of oil being delivered by the oil pump to the main regulator, resulting in a faster increase in oil pressure as the rotational speed of the oil pump increases.

Shifting to reverse is a manual process; when the manual selector valve 20 is set to reverse, a reverse line 42 is pressurized from the main pressure line 16 and the forward regulator pressure line 22, which is otherwise supplied from the main pressure line 16 through the manual selector valve 20, is cut off. Cutting off the forward regulator pressure line 22, which directs a negative feedback pressure to the main pressure regulator 14, functions to raise the main pressure in the transmission 100, and the main pressure is higher in reverse than in the forward gears and neutral. The pressurized reverse line 42 locks the 2-3 relay valve 30 and a 4-5 relay valve (not shown) to prevent application of the second or third clutches 124, 12 applies pressure to the fourth clutch 116, the fourth clutch apply pressure being conditioned by a fourth clutch trimmer valve (not shown).

In shifting from low gear to reverse gear, two clutches must be released, the forward clutch 114 and the low clutch 140, and two clutches must be applied, the first clutch 134 and the fourth clutch 116. In early series model MT 650 and 653 transmissions, with low main pressure in forward gears and no priority bypass valve, when the driver manually shifted from low gear to reverse gear, a significant period of time, on the order of five to forty seconds, could pass before reverse gear was engaged. This extended period was apparently attributable to the attenuated fluid flow path required to be pressurized to engage the first clutch 134.

In the later series model MT 650 and 653 transmissions, the reverse line 42 is also connected through the reverse priority bypass valve 50 to the first clutch pressure line 36. The reverse priority bypass valve 50 is a check valve which opens when the pressure in the reverse line 42 is greater than the pressure in the first clutch apply pressure line 36. This occurs when the manual selector valve 20 is switched from low to reverse gear, because the reverse line 42 need only be pressurized through the manual selector valve 20 and 2-3 relay valve 30 from the main pressure line 16, while the first clutch apply pressure line 36 must otherwise be pressurized through the priority valve 24, the 2-3 relay valve 30, and the 1-2 shift valve 34.

At some time after the reverse priority bypass valve 50 was added, the main pressure in forward gears was increased by the manufacturer as described below.

In the present invention, the reverse priority bypass valve 50 is omitted, as is shown in FIG. 3, a partial schematic diagram of a hydraulic system 104 to the present invention, and the main pressure is raised quickly when the transmission is shifted manually from a forward gear to reverse. Main pressure is fed through the selector valve 20 to provide the forward regulator pressure, which in turn reduces the main pressure in forward gears.

Figure 4:
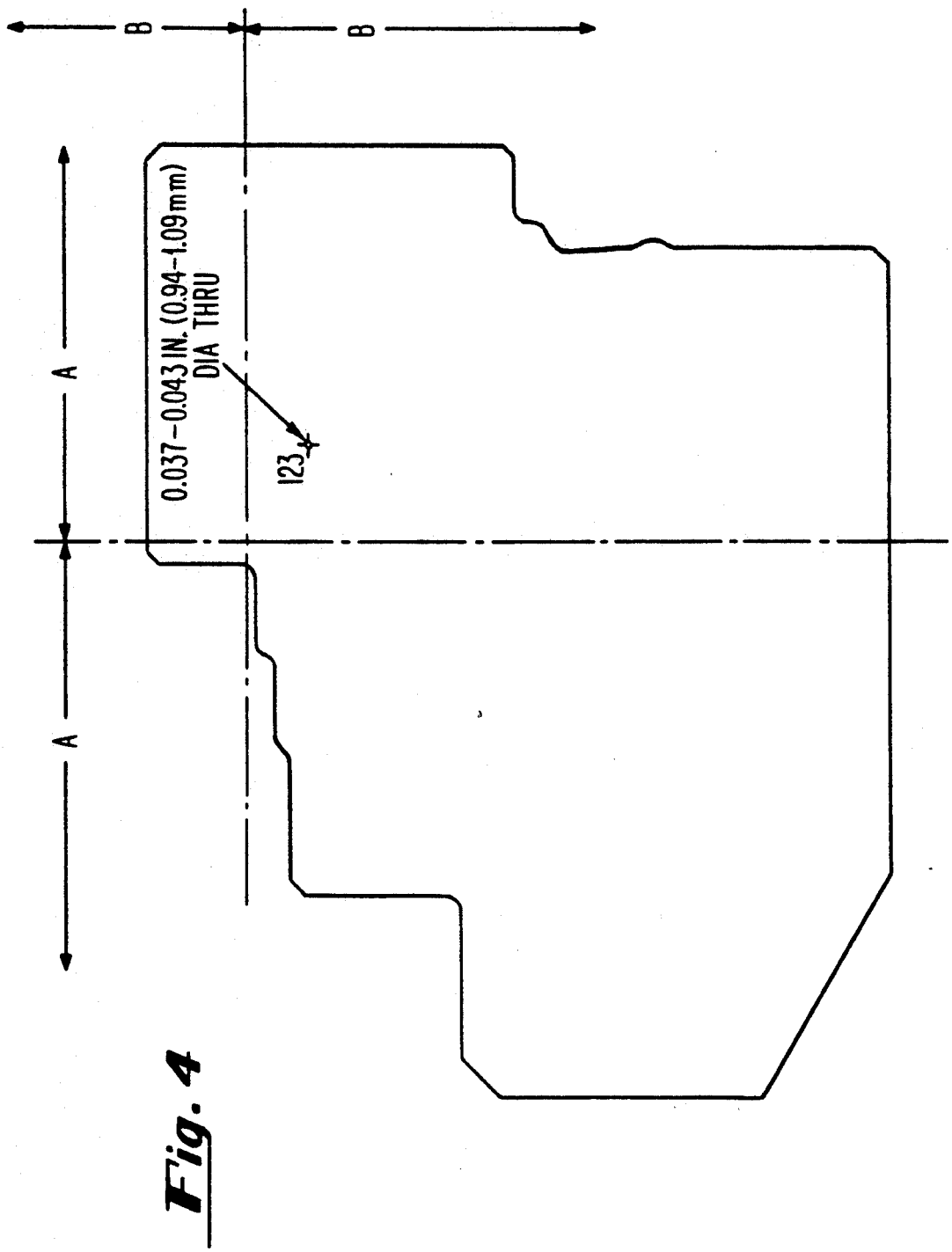
FIG. 4 is a plan view of a valve body separator plate for use in an improved Allison MT 653 transmission of the present invention.

The hydraulic control system 104 (shown schematically in FIG. 2) includes a control valve assembly (not shown) including a control valve body having a plurality of valves installed in bores formed in the body in a conventional manner. The control valve assembly also includes a separator plate 52 bolted to the top of the control valve body (not shown). A plan view of the separator plate 52 is shown in FIG. 4, with most apertures omitted for clarity. The separator plate 52 has a plurality of apertures connecting transmission fluid passageways in the valve body with fluid passageways in a valve body (not shown formed in the bottom of the transmission housing 102.

Respective passageways in the control valve body, apertures in the separator plate, and passageways in the valve body formed in transmission housing taken together comprise the various "lines" shown schematically in FIGS. 2 and 3.

The reverse priority bypass valve 50 includes a reverse priority check ball 54 having a 0.250 inch diameter and formed from a plastic material. A 0.187 inch diameter bypass aperture 56 is formed in a separator plate 52 in the position shown in FIG. 4 to connect the first clutch pressure apply line 36 and the reverse pressure line 42 through the reverse priority bypass valve 50.

The forward regulator pressure line 22 includes a passageway formed in the transmission housing 102 which is connected to a chamber 62 formed in the control valve body in which the selector valve body 64 is positioned through a forward knockdown pressure aperture 66 in the separator plate 52.

In early model 650 transmissions, the forward knockdown aperture 66 was large enough so that the main pressure applied through the selector valve 20 as feedback was not significantly altered by passage of fluid through that aperture 66. This is believed to have resulted in a substantial difference between the main pressure in forward gears and the main pressure in reverse. However, in recently manufactured OEM transmissions and in transmissions rebuilt in the field, including the improved transmissions of the present invention (FIG. 3), the forward knockdown aperture 68 is significantly smaller, having a diameter of from about 0.037 to 0.043 inches.

This reduction in the size of the forward knockdown aperture 66 is believed to have an important effect. When the selector valve 20 is shifted from a forward gear to reverse, the shifting valve body 64 closes the new forward knockdown aperture 68 more quickly and precisely than the old, irregularly shaped aperture 66 was closed. This, along with the greater rate at which the main oil pressure increases with increasing engine speed in the present transmission, are believed to result in a quicker reduction in the forward regulator pressure, and consequently, a quicker rise in the main pressure in reverse. The more quickly rising main pressure aids in effecting the quick application of pressure to the first and fourth clutches 134, 116, and helps reduce the delay previously encountered when a shift from low to reverse was made.

Various modifications can be made in the details of the construction and use of the above-described embodiment of the improved transmission of the present invention, all within the spirit and scope of the appended claims.

We claim:

1. A method for improving a modified Allison MT 650 or 653 automatic transmission of the type having a reverse bypass check valve in the hydraulic control system provided between the first clutch pressure apply line and the reverse pressure line, the method comprising:
   a) providing means for raising the rate of increase of the main hydraulic pressure in the transmission upon increase in the radial speed of the oil pump, and
   b) removing the check valve and sealing the aperture between the first clutch apply pressure line and the reverse line.

2. The method of claim 1 wherein the means for raising the rate of increase of main hydraulic pressure is effected by providing oil pump drive and driven gears having a width of at least about 0.8180 inches.

3. The method of claim 2, wherein the means for rate of increase of main hydraulic pressure further includes providing a control body separator plate having a forward knock-down pressure aperture formed therein, the forward knock-down aperture having a diameter of from about 0.037 to 0.043 inches.

* * * * *